United States Patent
Kreder

(10) Patent No.: US 9,211,821 B2
(45) Date of Patent: Dec. 15, 2015

(54) ANTI-PINCH SYSTEM FOR VEHICLE SEATING

(71) Applicant: Ford Global Technologies, LLC, Dearborn, MI (US)

(72) Inventor: Richard Alan Kreder, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/063,565

(22) Filed: Oct. 25, 2013

(65) Prior Publication Data

US 2015/0120150 A1 Apr. 30, 2015

(51) Int. Cl.
| | |
|---|---|
| *B60R 22/00* | (2006.01) |
| *B60N 2/44* | (2006.01) |
| *B60N 2/06* | (2006.01) |
| *A44B 11/00* | (2006.01) |
| *B60N 2/00* | (2006.01) |
| *B60N 2/01* | (2006.01) |
| *B60N 2/02* | (2006.01) |
| *B60R 22/48* | (2006.01) |

(52) U.S. Cl.
CPC ............. *B60N 2/442* (2013.01); *A44B 11/005* (2013.01); *B60N 2/002* (2013.01); *B60N 2/01* (2013.01); *B60N 2/0224* (2013.01); *B60N 2/0248* (2013.01); *B60N 2/06* (2013.01); *B60N 2002/0256* (2013.01); *B60N 2002/445* (2013.01); *B60R 2022/4816* (2013.01)

(58) Field of Classification Search
None
See application file for complete search history.

(56) References Cited

U.S. PATENT DOCUMENTS

| | | | |
|---|---|---|---|
| 4,852,934 A | 8/1989 | Yasuda et al. | |
| 6,820,911 B2 | 11/2004 | Furui | |
| 8,364,352 B2 | 1/2013 | Mimura | |
| 8,403,414 B2 | 3/2013 | Osaki | |
| 2003/0234551 A1* | 12/2003 | Taguchi et al. | 296/64 |
| 2009/0048739 A1* | 2/2009 | Midorikawa | 701/45 |
| 2010/0082384 A1* | 4/2010 | Bohrer et al. | 705/7 |
| 2011/0228429 A1* | 9/2011 | Ueta et al. | 361/31 |

FOREIGN PATENT DOCUMENTS

| | | |
|---|---|---|
| FR | 2740744 | 3/1995 |
| WO | 2008037313 | 4/2008 |

OTHER PUBLICATIONS

Chrysler. "Easy Entry/Exit Seat (Available With Memory Seat Only)". http://www.chryclub.com/cinfo-907.html. 3 pages. Jun. 3, 2013.

* cited by examiner

*Primary Examiner* — Adam Alharbi
(74) *Attorney, Agent, or Firm* — Vichit Chea; Price Heneveld LLP

(57) ABSTRACT

An anti-pinch system for vehicle seating includes a front seat that has an actuator configured to automatically slide the front seat between the driving position and entry/exit position. A rear seat is fixed rearward from the front seat and has a seatbelt that releasably engages a clasp. A memory module prevents the front seat from automatically moving rearward to the entry/exit position when the seatbelt is engaged to the clasp.

15 Claims, 4 Drawing Sheets

ANTI-PINCH SYSTEM FOR VEHICLE SEATING

FIELD OF THE INVENTION

The present invention generally relates to an anti-pinch system for vehicle seating and more particularly relates to an anti-pinch system for memory seating in a vehicle.

BACKGROUND OF THE INVENTION

Memory systems are more commonly being incorporated into seating assemblies in a variety of vehicles for storing seating settings, such as a recline angle, a seat position, and other personalized settings for an occupant within the vehicle. One feature for these memory systems includes automatically adjusting the seat longitudinally to provide more space for easy entry into the vehicle and exit from the vehicle. However, adjusting a front seat rearward may constrict an occupant located immediately rearward from the seat being adjusted.

SUMMARY OF THE INVENTION

According to one aspect of the present invention, an anti-pinch system for vehicle seating includes a front seat that has an actuator configured to automatically slide the front seat between a driving position and an entry/exit position. A rear seat is fixed rearward from the front seat and has a seatbelt that releasably engages a clasp. A memory module prevents the front seat from automatically moving rearward to the entry/exit position when the seatbelt is engaged to the clasp.

According to another aspect of the present invention, an anti-pinch system for memory seating in a vehicle includes a front seat that is slidably coupled within the vehicle. A rear seat has a seatbelt that removably engages an attachment sensor that senses when the seatbelt is engaged. A memory module automatically slides the front seat rearward to an entry/exit position when the vehicle turns off. A memory module also prevents the front seat from automatically sliding to the entry/exit position when the seatbelt is engaged.

According to yet another aspect of the present invention, a method for operating memory seating in a vehicle includes providing a front seat that has an actuator configured to automatically slide the front seat between a driving position and an entry/exit position. The rear seat is fixed rearward from the front seat and a seatbelt on the rear seat releasably engages a clasp. The front seat is automatically moved rearward to the entry/exit position when an ignition switch of the vehicle moves from a run position to an off position. The front seat is prevented from automatically moving rearward to the entry/exit position when the seatbelt is engaged to the clasp.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
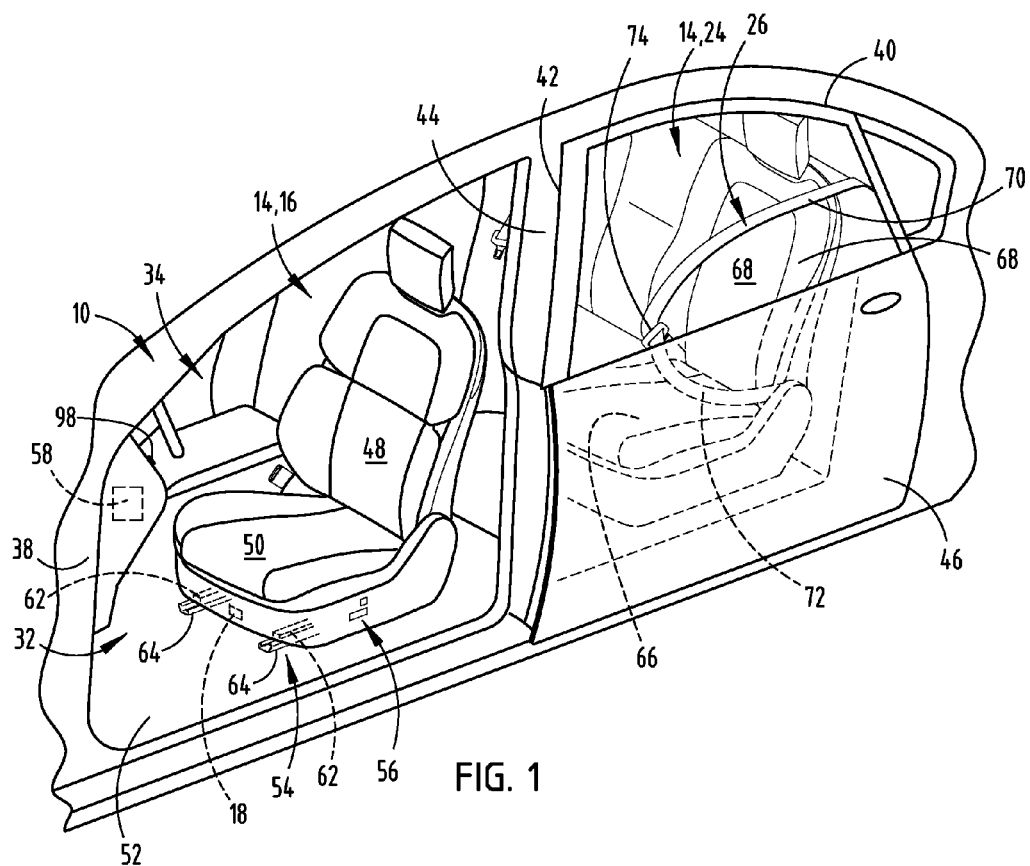
FIG. 1 is top perspective view of an interior portion of a vehicle having a front seat and a rear seat, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, reference numeral 10 generally designates a vehicle having an anti-pinch system 12 for seating 14 within the vehicle 10. A front seat 16 has an actuator 18 configured to automatically slide the front seat 16 between a driving position 20 and an entry/exit position 22. A rear seat 24 is fixed rearward from the front seat 16 and has a seatbelt 26 that releasably engages a clasp 28. A memory module 30 prevents the front seat 16 from automatically moving rearward to the entry/exit position 22 when the seatbelt 26 is engaged to the clasp 28.

Figure 2:
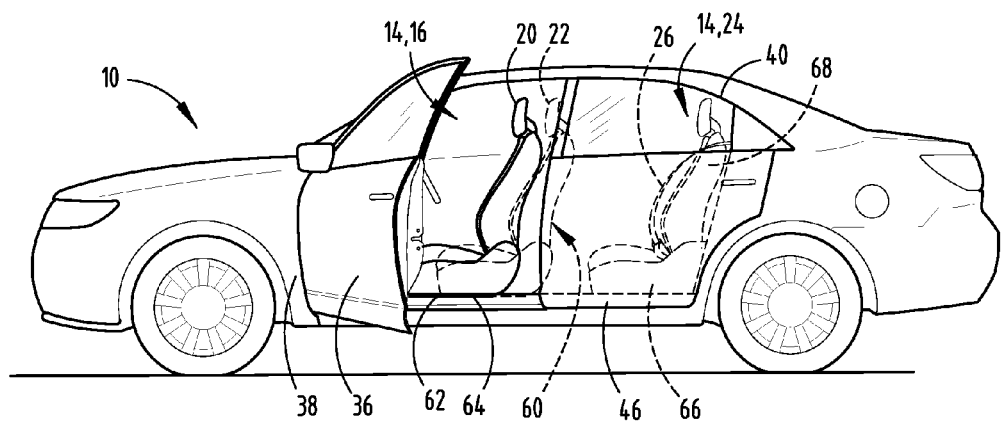
FIG. 2 is a side elevational view of the front seat moving from a driving position to an entry/exit position within the vehicle.

As shown in FIG. 1, the vehicle 10 includes a front door opening 32 that provides access to an interior portion 34 of the vehicle 10, proximate the front seat 16. The front door opening 32 is enclosed with a front side door 36 (FIG. 2) that pivots about a forward edge 38 of the front door opening 32 to move between an open position, as shown in FIG. 2, and a closed position. A rear door opening 40 is located rearward from the front door opening 32 on the same side of the vehicle 10 and similarly provides access to the interior portion 34 area proximate the rear seat 24. A front edge 42 of the rear door opening 40 is defined by a frame pillar 44 that separates the front door opening 32 from the rear door opening 40. The rear door opening 40 is enclosed with a rear side door 46 that pivots about the front edge 42 to move between a closed position, as shown in FIG. 1, and an open position. It is generally understood that the opposing lateral side of the vehicle 10 is a substantial mirror image of the side illustrated in FIG. 1, and accordingly includes a corresponding front seat and rear seat situated adjacent to a corresponding door opening and includes other corresponding features described with regard to the illustrated side of the vehicle 10, unless specified to the contrary. It is also understood that various vehicle types are contemplated for the present invention, including an automobile that may include a sliding door, additional door openings rearward from the rear door opening, or may otherwise not include the rear door opening.

The front seat 16, as illustrated in FIGS. 1 and 2, is a bucket-style seat assembly having a seatback 48 pivotally coupled with a seat bottom 50 for reclining the seatback 48 between various angles relative to the seat bottom 50. The seat bottom 50 of the front seat 16 is slidably coupled with a floor 52 of the vehicle 10 to enable the longitudinal position of the front seat 16 to be adjusted forward and rearward relative to the floor 52 of the vehicle 10. More specifically, the seat bottom 50 of the front seat 16 includes the actuator 18 and a track assembly 54, such that operation of the actuator 18 can move the front seat 16 forward and rearward about the track assembly 54. The actuator 18 and other portions of the front seat 16 may be manually operated to adjust the orientation and position of the front seat 16 by moving a button interface 56 on an outboard side of the seat bottom 50. The actuator 18 may also be automatically operated by a controller 58 of the vehicle 10 to adjust the front seat 16 rearward from the driving position 20 to the entry/exit position 22, as shown in FIG. 2, placing a back surface 60 of the front seat 16 in closer proximity to the rear seat 24, which is described in more detail below.

As further shown in FIGS. 1 and 2, the illustrated embodiment of the track assembly 54 includes a top rail 62 that slides within a channel on an upper surface of a bottom rail 64 that is fixed to the floor 52. The actuator 18 may be a motor driven worm gear that is configured to adjustably slide the top rail 62 relative to the bottom rail 64 and also to prevent the top rail 62 from sliding relative to the bottom rail 64 when the actuator 18 is not actively adjusting the position of the front seat 16. It is understood that in additional embodiments, the actuator 18 may include other types of actuators 54 and the track assembly may similarly be a different type of longitudinal adjustment mechanism, as generally understood by one having ordinary skill in the art. In addition, the orientation and position of the front seat 16 may also be manually operated with an alternatively located button interface or a different input device.

The rear seat 24, as shown in FIGS. 1 and 2, is a bench-style seat assembly that spans laterally across the interior portion 34 of the vehicle 10. A seat portion 66 of the rear seat 24 is fixedly coupled with the floor 52 and a seatback portion 68 of the rear seat 24 extends upward from the seat portion 66 to provide support to an occupant's back. It is contemplated that the seatback portion 68 may pivot relative to the seat portion 66 to provide a reclining feature, and it is contemplated that the seat portion 66 may be capable of longitudinal adjustment in alternative embodiments of the vehicle 10 that have interior space rearward from the rear seat 24. It is understood that the seating 14, namely the front and rear seats 16, 24, of the present invention may alternatively be configured with a bench-style or a bucket-style seat assembly, or styles of seat assemblies as generally understood by one having ordinary skill in the art.

With additional reference to FIGS. 1 and 2, the rear seat 24 includes a seatbelt 26 that spans across the rear seat 24 and removably engages a clasp 28 that extends upward from an inboard area of the seat portion 66 of the rear seat 24. The seatbelt 26 includes a shoulder strap 70 that extends diagonally downward from an upper outboard area of the seatback portion 68 and a waist strap 72 that extends laterally from the lower outboard area of the seatback portion 68. The shoulder and waist straps 70, 72 are gathered and held at the respective outboard areas of the seatback portion 68, such as by being wound on a spring biased spool that is also configured to lock and hold the seatbelt 26 from releasing upon impact sudden stopping of the vehicle 10. The shoulder and waist straps 70, 72 are integrally connected together as portions of a unitary seatbelt strap of the seatbelt 26 and are thereby defined on opposing sides of a buckle 74 that is slidably disposed on the unitary seatbelt strap. The buckle 74 is configured to engage the clasp 28 to secure an occupant in the rear seat 24. It is, however, contemplated that the shoulder and waist straps 70, 72 may be separate and individually attached to the buckle 74, and it is further contemplated that the shoulder strap 70 may be omitted in some embodiments.

Figure 3:
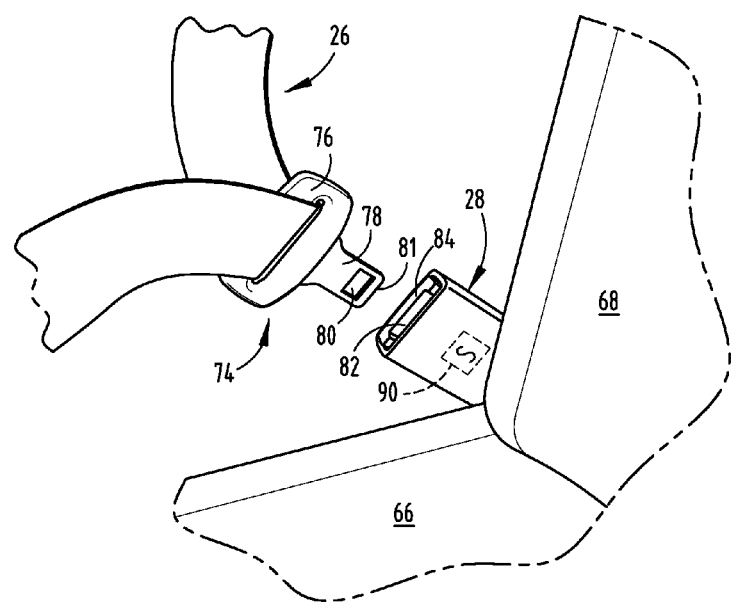
FIG. 3 is a top perspective view of a seatbelt in the rear seat and an associated clasp that has an attachment sensor.
Figure 3A:
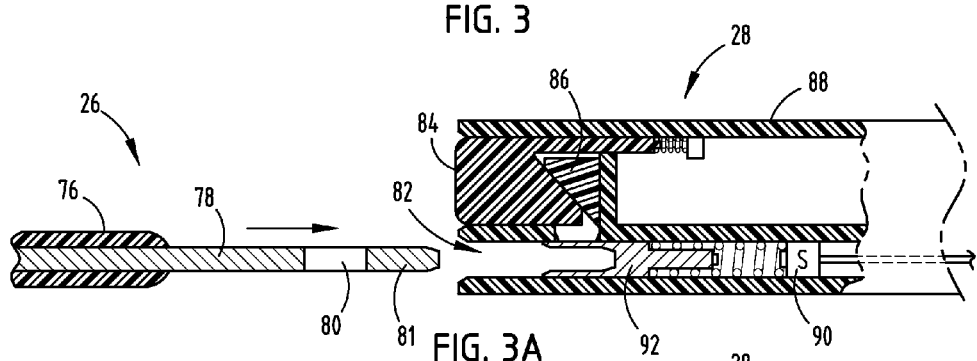
FIG. 3A is a cross sectional view of the clasp of FIG. 3, having the seatbelt disengaged from the clasp.
Figure 3B:
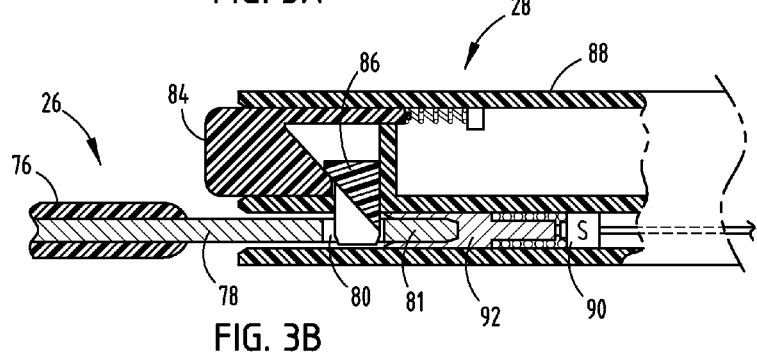
FIG. 3B is a cross sectional view of the clasp of FIG. 3, having the seatbelt engaged with the clasp.

Referring now to FIGS. 3-3B, the buckle 74 of the seatbelt 26 is shown being inserted into and engaged with the clasp 28. The buckle 74, in the embodiment illustrated in FIG. 3, is disengaged from the clasp 28 and includes a loop member 76 for surrounding the unitary seatbelt strap and a metal attachment member 78 extending from the loop member 76. The attachment member 78 is substantially planar and includes a central aperture 80 proximate a distal end 81 thereof. Accordingly, the clasp 28 includes a slot 82 for receiving the metal attachment member 78 and a push button 84 for releasing the buckle 74 from engagement with the clasp 28.

As shown in FIGS. 3A and 3B, a locking pin 86 is arranged within a housing 88 of the clasp 28 to laterally pass through the slot 82 to engage the central aperture 80 of the attachment member 78, upon inserting the distal end of the attachment member 78 beyond the locking pin 86. The bottom of the slot 82 includes an attachment sensor 90 that senses when the seatbelt 26 is engaged. Specifically, in the illustrated embodiment, the attachment sensor 90 is positioned to contact an extension pin 92 that is spring biased within the housing of the clasp 28. As shown in FIG. 3B, the distal end of the metal attachment member 78 abuts and pushes the extension pin 92 to contact the attachment sensor 90 in an engaged position 94. The attachment sensor 90 is electrically coupled with the controller 58 of the vehicle 10 to provide a signal as to when the seatbelt 26 is engaged to the clasp 28, indicating that an occupant is seated in the rear seat 24 of the vehicle 10. The push button 84 may then be depressed to disengage the locking pin 86 from the central aperture 80 and eject the attachment member 78 from the housing 88 of the clasp 28, placing the seatbelt 26 in a disengaged position 96. The clasp 28 may be alternatively constructed in other embodiments to receive the buckle 74 and to interface with the attachment sensor 90. Furthermore, in other embodiments the attachment sensor 90 may also include additional or alternative types of electromechanical or electrical switches or sensors that can be configured to sense when the seatbelt 26 is engaged with the clasp 28.

Figure 4:
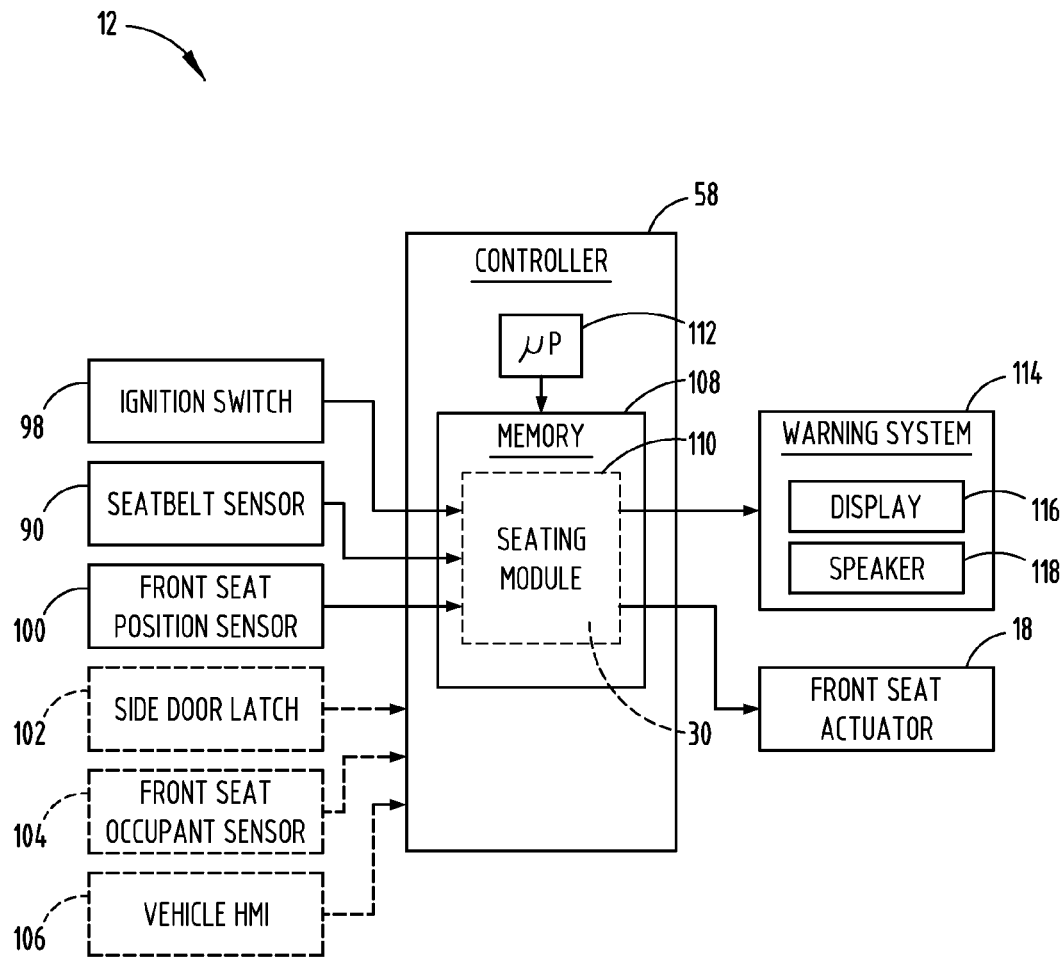
FIG. 4 is a schematic diagram of the anti-pinch system having a controller that executes a memory seating module.

As shown in the embodiment illustrated in FIG. 4, the controller of the vehicle 10 receives input from the attachment sensor 90 as well as an ignition switch 98 (FIG. 1) of the vehicle 10 and a position sensor 100 of the front seat 16. The ignition switch 98 is movable between a run position to start the engine of the vehicle 10 and an off position to stop the engine of the vehicle 10. As such, the ignition switch 98 is operable to activate the electrical system of the vehicle 10, providing power to the ignition system and other electrical components of the vehicle 10, including the actuator 18 for the front seat 16, the attachment sensor 90 of the seatbelt 26 in the rear seat 24, and other devices connected with the controller 58. In some vehicles, the ignition switch may be operated by inserting and rotating a key to move the ignition switch between the run and off positions or by pressing a button on the ignition switch when the vehicle senses a key fob within the vehicle. In some embodiments, the ignition switch may be operated wirelessly, in which case the vehicle may be configured to require a confirmation input within the vehicle prior to shifting the transmission into gear.

In addition, the position sensor 100 for the front seat 16, as shown in FIG. 4, is coupled with the controller 58 and is configured to determine the longitudinal position of the front seat 16 relative to the floor 52. More specifically, the position sensor 100 in one embodiment may be incorporated with the actuator 18 to determine the position of the front seat 16 relative to the bottom rail 64 of the track assembly 54 and thereby transmit the longitudinal position of the front seat 16 to the controller 58. The position sensor 100 in one embodiment may also simply provide an indication that the front seat 16 has reached a defined position, such as a middle position or one of the opposing forward or rearward end positions on the track assembly 54, thereby transmitting the position of the front seat 16 to the controller 58, which may then direct the actuator 18 to cease further movement of the front seat 16 in the respective forward or rearward direction. Accordingly, the position sensor 100 may be various types of electro-mechanical or electrical switches or sensors, as generally understood by one having ordinary skill in the art.

As illustrated in FIG. 4, the controller 58 of the vehicle 10 may also receive input from a side door latch 102, a front seat occupant sensor 104, and a human-machine interface (HMI) 106 of the vehicle 10, along with other conceivable or necessary inputs to operate the anti-pinch system 12 of the present invention. The side door latch 102, similar to the attachment sensor 90 of the seatbelt 26, is configured to determine when the front door is engaged in the closed position, and likewise, when the front door is disengaged from the side door latch in the open position. The front seat occupant sensor 104 may be a seat belt sensor or other conceivable sensor for determining that an occupant is seated in the front seat 16 of the vehicle 10. The HMI 106 may be a microphone on the vehicle 10, a mobile device electrically coupled with the vehicle 10, a physical or digital button arrangement on an interior surface of the vehicle 10, such as the dashboard, a display, or the instrument panel, or other interface inputs for receiving input commands, as generally known by one having ordinary skill in the art.

According to one embodiment, as shown in FIG. 4, the controller 58 may include a memory unit 108 that stores a seating module 110 that has the memory module 30 of the anti-pinch system 12. The controller also has a microprocessor 112 that executes the seating module to automatically control the front seat 16. Specifically, the seating module may store memorized seating positions and upon an occupant's selection of one of these seating positions, the controller 58 may automatically move the front seat 16 to the desired memorized position. This feature is generally known as a memory seat function. The controller 58 may be configured as part of a shared controller used for other purposes or configured with multiple microprocessors and memory units integrated in various locations and components as parts of or separate from the vehicle 10. The memory unit may include random access memory (RAM), read-only memory (ROM), and electrically erasable programmable read-only memory (EEPROM). It is also contemplated that the seating module may be combined or incorporated with other routines to perform the general function of the front seat 16, other seating 14 within the vehicle 10, and other vehicle settings, as described herein.

As further illustrated in FIG. 4, the controller of the anti-pinch system 12 is electrically coupled with several outputs, including the actuator 18 for the front seat 16 and a warning system 114. It is also understood that additional outputs may be incorporated with the anti-pinch system 12, such as other components of the front seat 16 or a wireless device. The warning system 114 is shown to include a display 116 that is on an interior surface of the vehicle 10 or conceivably on a wireless device or other location visible by the occupant seated in the front seat 16. Also, the warning system 114 includes at least one speaker 118 that may be separate or part of the stereo system of the vehicle 10 or may be a speaker on an auxiliary device, such as a wireless device, that is audible by the occupant seated in the front seat 16.

The actuator 18 is configured as an output of the memory module 30 of seating module to receive instructions from the controller 58 to automatically slide the front seat 16 rearward to the entry/exit position 22 when the ignition switch 98 moves to the off position. This function may be referred to as an easy entry setting. The entry/exit position 22, according to the illustrated embodiment, is defined as a position relative to the selected driving position 20 of the front seat 16, as the driving position 20 is determined by the size and preferences of the occupant in the front seat 16. In this embodiment the entry/exit position 22 will be a set distance rearward from the selected driving position 20, such as approximately 50 millimeters, or in another embodiment at least 1 inch, unless the rearward end position is reached prior to moving the set distance, upon which the rearward end position would also be the entry/exit position 22. According to another embodiment the entry/exit position 22 is defined as a position of the front seat 16 relative to the floor and the fixed bottom rail 64 of the track assembly 54, such as 1 inch forward from the rearward end position on the track assembly.

Figure 5:
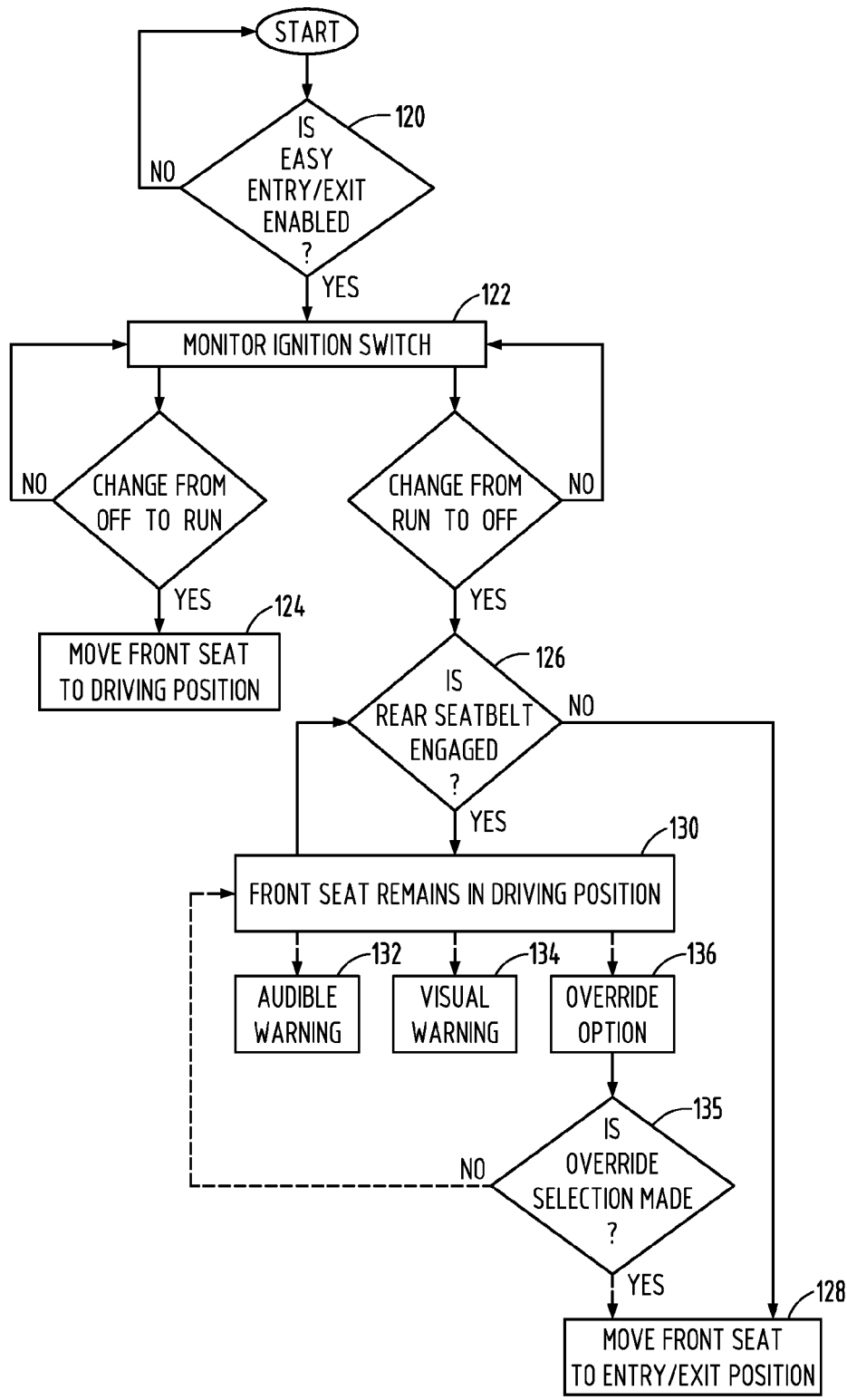
FIG. 5 is a flowchart illustrating a method for operating memory seating in the vehicle.

Referring now to FIG. 5, at least a portion of the logic of the memory module 30 is illustrated to shown the method of operating the front seat 16 with the anti-pinch system 12. To start the system, at step 120 the easy/entry setting is monitored to determine whether the occupant has selected to enable the easy/entry setting, allowing the front seat 16 move in some instances to move to the entry/exit position 22 (FIG. 2) for increasing the space between the steering wheel and the front seat 16 and thereby providing an easier transition into and out of the vehicle 10. When the easy/entry setting is enabled, at step 122 the ignition switch 98 is monitored to determine whether the ignition switch 98 has changed condition, either changing from run to off or from off to run. Once the ignition switch 98 is moved from off to run, the controller 58 determines that the occupant has entered the vehicle 10 and would like the front seat 16 to assume the driving position 20, whereby at step 124 the controller 58 instructs the actuator 18 to move the front seat 16 to the memorized driving position 20. The memorized driving position 20 may be a preset preferred position for the occupant or the last position of the front seat 16 during operation of the vehicle 10. In additional embodiments, the front seat occupant sensor 104 may also be monitored in addition to the change of the ignition switch 98 from off to run, to determine that the occupant is seated in the front seat 16 and would like the front seat to assume the driving position 20.

Upon monitoring the ignition switch 98 at step 122, when the ignition switch 98 is moved from run to off, the controller 58 determines that the occupant is prepared to exit the vehicle 10 and would like the front seat 16 to assume the entry/exit position 22. As such, at step 126 the anti-pinch system 12 checks the attachment sensor 90 of the seatbelt 26 to determine whether the seatbelt 26 in the rear seat 24 is engaged. If the seatbelt 26 is not engaged when the vehicle 10 turns off, the controller 58 determines that an occupant is not present in the rear seat 24 and thereby will not be constricted by the front seat 16 moving rearward to the entry/exit position 22. When the seatbelt 26 is not engaged, at step 128 the memory module 30 operates the actuator 18 of the front seat 16 to automatically move the front seat 16 to the entry/exit position 22. However, when the seatbelt 26 is engaged, at step 130 the front seat 16 is instructed by the seating module to remain in the driving position 20, until the seatbelt 26 in the rear seat 24 is disengaged.

At step 130, with the front seat 16 in the driving position 20, in some embodiment the warning system may be activated to indicate to the occupant in the front seat 16 that the front seat 16 will not move to entry/exit position 22 because an occupant is sensed in the rear seat 24. The warning system is configured to provide an alert to the occupant in the front seat 16 that the front seat 16 is not moving to the entry/exit position 22 because the seating module senses an occupant secured with the seatbelt 26 in the rear seat 24. The warning system may be any one or a combination of an audible warning 132, such as a tone or voice message, and a visual warning 134, such as a flashing light and a display reading. At step 136 an override option may also be presented to the occupant in the front seat 16. The override option may be embodied in a prompt displayed on a display within the vehicle 10, a specific button to allow the front seat 16 to move to the easy/entry position, a voice command, a button of the button arrayed used for manually adjusting the front, or other conceivable HMI 106 controls. This override option may be monitored at step 138, and upon manually selecting the override option the seating module will instruct the front seat 16 to move to the entry/exit position 22, at step 128.

Accordingly, the anti-pinch system 12 checks the attachment sensor 90 of the seatbelt 26 to determine whether the seatbelt 26 in the rear seat 24 is engaged to prevent the front seat 16 from moving rearward to a position near or at the entry/exit position 22 that traps or pinches the feet of the occupant in the rear seat 24, and further prevents the front seat 16 from moving rearward to a position that otherwise causes the back surface of the front seat 16 to contact the occupant or passenger in the rear seat 24. The back surface of the front seat 16 includes portions of the seat bottom 50 and the seatback 48 that may come into contact with or otherwise restrict an occupant seated in the rear seat 24.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An anti-pinch system for vehicle seating, comprising:
   a front seat having an actuator configured to automatically slide the front seat between a driving position and an entry/exit position;
   a memory module that prevents the front seat from automatically moving rearward to the entry/exit position when a seatbelt is engaged with a rear seatbelt clasp unless manually overridden; and
   a display providing an alert when the front seat is prevented from moving.

2. The anti-pinch system of claim 1, further comprising:
   a vehicle ignition switch that is movable between a run position and an off position, wherein the actuator automatically slides the front seat rearward to the entry/exit position when the ignition switch moves to the off position.

3. The anti-pinch system of claim 1, further comprising:
   a sensor coupled with the clasp that senses when the seatbelt is engaged to the clasp, wherein the sensor is electrically coupled with the memory module to indicate when seatbelt is engaged to the clasp.

4. The anti-pinch system of claim 1, further comprising:
   an override switch that is manually actuatable to override the memory module to move the front seat to the entry/exit position when the seatbelt is engaged to the clasp.

5. The anti-pinch system of claim 1, wherein a back surface of the front seat in the entry/exit position is in closer proximity to the rear seat than in the driving position, and wherein the seatbelt spans across the rear seat for securing a passenger in the rear seat, such that the back surface may contact the passenger when the front seat moves to entry/exit position.

6. An anti-pinch system for memory seating in a vehicle, comprising:
   a front seat slidably coupled within the vehicle;
   a rear seat having a seatbelt that removably engages an attachment sensor that senses when the seatbelt is engaged;
   a memory module that automatically slides the front seat rearward to an entry/exit position when the vehicle turns off and that prevents the front seat from automatically sliding to the entry/exit position when the seatbelt is engage; and a display coupled with the memory module and configured to display an alert message when the memory module prevents the front seat from moving to the entry/exit position, wherein the alert message includes an override selection that is manually selectable to override the memory module to move the front seat to the entry/exit position when the seatbelt is engaged to the clasp.

7. The anti-pinch system of claim 6, further comprising:
a vehicle ignition switch that is movable between a run position and an off position, wherein the actuator automatically slides the front seat rearward to the entry/exit position when the ignition switch moves to the off position.

8. The anti-pinch system of claim 6, further comprising:
a sensor coupled with the clasp that senses when the seatbelt is engaged to the clasp, wherein the sensor is electrically coupled with the memory module to indicate when seatbelt is engaged to the clasp.

9. The anti-pinch system of claim 6, further comprising:
an override switch that is manually actuatable to override the memory module to move the front seat to the entry/exit position when the seatbelt is engaged to the clasp.

10. The anti-pinch system of claim 1, wherein a back surface of the front seat in the entry/exit position is in closer proximity to the rear seat than in the driving position, and wherein the seatbelt spans across the rear seat for securing a passenger in the rear seat, such that the back surface may contact the passenger when the front seat moves to entry/exit position.

11. A method for operating memory seating in a vehicle, comprising:
providing a front seat having an actuator that is configured to automatically slide the front seat between a driving position and an entry/exit position;
positioning a rear seat fixed rearward from the front seat;
providing a seatbelt proximate the rear seat that releasably engages a clasp;
automatically moving the front seat rearward to the entry/exit position when an ignition switch of the vehicle moves from a run position to an off position such that the back surface may contact the passenger when the front seat moves to entry/exit position;
positioning a back surface of the front seat in the entry/exit position closer to the rear seat than when the front seat is in the driving position;
positioning the seatbelt to span across the rear seat to secure a passenger in the rear seat; and
preventing the front seat from automatically moving rearward to the entry/exit position when the seatbelt is engaged to the clasp.

12. The method of claim 11, further comprising:
sensing when the seatbelt is engaged to the clasp with a sensor coupled with the clasp that, wherein the sensor indicates when seatbelt is engaged to the clasp.

13. The method of claim 11, further comprising:
actuating an override switch to move the front seat to the entry/exit position when the seatbelt is engaged to the clasp.

14. The method of claim 11, further comprising:
displaying an alert message when the front seat is prevented from moving to the entry/exit position, wherein the alert message includes an override selection that is manually selectable to override the memory module to move the front seat to the entry/exit position when the seatbelt is engaged to the clasp.

15. The method of claim 11, wherein the entry/exit position of the front seat is a set distance from the driving position, such that the entry/exit position is based on the driving position.

* * * * *